United States Patent
Laube

[11] Patent Number: 6,077,003
[45] Date of Patent: Jun. 20, 2000

[54] TOOL HOLDER

[75] Inventor: Robert Laube, Mt. Clemens, Mich.

[73] Assignee: Hydra-Lock Corporation, Mt. Clemens, Mich.

[21] Appl. No.: 09/098,263

[22] Filed: Jun. 16, 1998

[51] Int. Cl.[7] .............................. B23C 5/26; B23B 31/40
[52] U.S. Cl. .................. 409/234; 279/2.08; 279/103; 409/233
[58] Field of Search .................... 279/2.08, 103; 409/233, 234

[56] References Cited

U.S. PATENT DOCUMENTS

| | | | |
|---|---|---|---|
| 3,830,509 | 8/1974 | Weber | 279/2.08 |
| 4,504,179 | 3/1985 | Nicolin | 409/234 |
| 4,726,721 | 2/1988 | Heel et al. | 409/233 |
| 5,030,047 | 7/1991 | Pfalzgraf | 409/234 |
| 5,201,621 | 4/1993 | McMurtry et al. | 409/233 |
| 5,516,243 | 5/1996 | Laube | 408/239 R |
| 5,775,857 | 7/1998 | Johne | 409/234 |
| 5,964,556 | 10/1999 | Toyomoto | 409/234 |

*Primary Examiner*—Steven C. Bishop
*Attorney, Agent, or Firm*—Reising, Ethington, Barnes, Kisselle, Learman & McCulloch, P.C.

[57] ABSTRACT

A tool holder with an elongate and expanding sleeve within a confining recess of a machine spindle to circumferentially engage the machine spindle and accurately, firmly and concentrically engage a machine tool adjacent to a machine spindle. In one form, a tapered expanding sleeve is disposed about the exterior of the tool holder and is received between the tool holder and the machine spindle in a tapered recess of the machine spindle. A hydraulic fluid is disposed between the tool holder and the expanding sleeve and is pressurized to expand the sleeve into firm engagement with the machine spindle. In another form, the expanding sleeve is received interiorly of a central bore within the tool holder and longitudinal grooves are provided in the sleeve about its circumference forming generally individual fingers. An expander member is disposed within the expanding sleeve and is slidably displaceable to expand the expansion sleeve into firm engagement with the inner wall of the tool holder, which preferably has slots machined through the wall to facilitate displacement of the wall, and thereby urge the tool holder into firm engagement with the machine spindle.

17 Claims, 3 Drawing Sheets

TOOL HOLDER

FIELD OF THE INVENTION

This invention relates to machine tools and more particularly to a tool holder.

BACKGROUND OF THE INVENTION

Hydrostatic holding devices have been used for a number of years to hold workpieces which are to be machined or ground. Also, U.S. Pat. No. 5,516,243 discloses a hydrostatic holding device constructed to hold a reamer chuck within a tool spindle and also a hydrostatic holding device constructed to releasably hold a cutting tool within the reamer. Both of these hydrostatic holding devices utilize a sleeve which contracts under hydraulic fluid pressure to firmly hold the object within the sleeve. These sleeves are generally cylindrical and are constructed to receive a cylindrical shank of a tool or tool holder.

Other tool holder devices utilize a machine spindle having a tapered recess into which a complementary shaped chuck or machine tool is inserted. To accurately and concentrically align the chuck with the machine spindle, each tapered portion must be exactly complementary in shape to provide substantially full engagement between the chuck and the machine spindle along the entire length of the tapered portions. Further, to ensure a concentric fit between the chuck and machine spindle it is desirable that the full engagement between the two occur simultaneously with the mating of transverse opposed flat faces of the spindle and chuck. It is extremely difficult to accurately manufacture the tapered portions of both the chuck and the machine spindle to provide this precise engagement needed to ensure a concentric and accurate fit. Further, during use the tapered portions become worn which further degrades the engagement of the spindle and chuck.

SUMMARY OF THE INVENTION

A tool holder with an elongate and expanding sleeve within a confining recess of a machine spindle to circumferentially engage the machine spindle and accurately, fly and concentrically engage a machine tool adjacent to a machine spindle. In one form, a tapered expanding sleeve is disposed about the exterior of the tool holder and is received between the tool holder and the machine spindle in a tapered recess of the machine spindle. A hydraulic fluid is disposed between the tool holder and the expanding sleeve and is pressurized to expand the sleeve into firm engagement with the machine spindle. In another form, the expanding sleeve is received interiorly of a central bore within the tool holder and longitudinal grooves are provided in the sleeve about its circumference forming generally individual fingers. An expander member is disposed within the expanding sleeve and is slidably displaceable to expand the expansion sleeve into firm engagement with the inner wall of the tool holder, which preferably has slots machined through the wall to facilitate displacement of the wall, and thereby urge the tool holder into firm engagement with the machine spindle.

To increase the accuracy and repeatability of locating the tool holder within the machine spindle, the expansion of the expanding sleeve is controlled to allow the tool holder to be completely inserted into the machine spindle so that opposed and flat faces of the machine spindle and tool holder are engaged to align the tool holder within the spindle before the sleeve is expanded to firmly engage the tool holder with the spindle. With this engagement, the opposed flat faces of the machine spindle and tool holder provide accurate and concentric alignment of the spindle and tool holder and the expanding sleeve ensures firm, releasable and repeatable engagement of the tool holder and spindle.

Objects, features, and advantages of this invention include providing a tool holder which accurately, concentrically and firmly engages a tool holder with a machine spindle, allows substantially complete insertion of the tool holder into the spindle prior to firmly engaging them, in one form provides hydrostatic fluid under pressure to releasably and firmly engage the tool holder with the spindle, in another form provides purely mechanical expansion of the tool holder to releasably and firmly engage the tool holder with the machine spindle, substantially eliminates the problem associated with non-uniform tapered tool holders and machine spindles, provides a tool holder which can be quickly released, removed and exchanged within a machine spindle, maintains a firm engagement between the tool holder and machine spindle even after wear of the mating surfaces due to use, is rugged, durable, reliable, of relatively simple design and economical manufacture and has a long useful life in-service.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1:
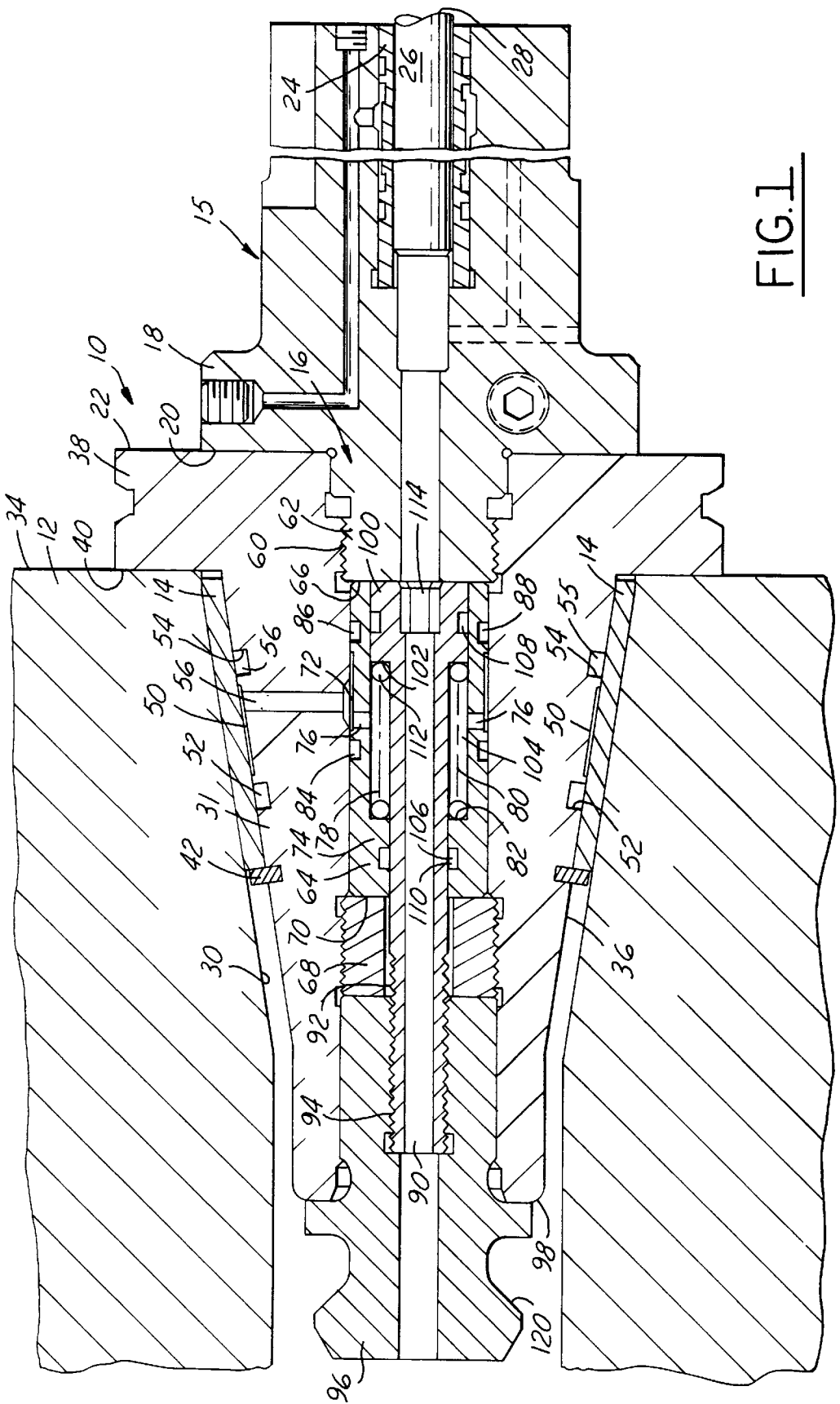
FIG. 1 is a sectional view of a machine tool holder having an expandable sleeve in communication with a hydraulic fluid and received within a tapered recess of a machine spindle according to the present invention.

Referring in more detail to the drawings, FIG. 1 illustrates a chuck 10 received in and driven by a machine spindle 12 for machining various surfaces of a work piece. The chuck 10 has an expanding sleeve 14 which expands slightly under hydrostatic fluid pressure to firmly engage the chuck 10 with the machine spindle 12.

The chuck 10 threadably receives a tool holder 15 in a central bore 16 of the chuck 10. The machine tool holder 15 has a radially extending flange 18 with a substantially flat face 20 generally opposed and mated to a generally flat face 22 of the chuck 10. The machine tool 15 preferably has a sleeve 24 which contracts when acted on by hydraulic fluid under pressure to clamp the shank 26 of a center tool 28. The interface of the center tool 28 with the machine tool holder 15 is as disclosed in U.S. Pat. No. 5,516,243 the disclosure of which is incorporated herein by reference and hence will not be described in greater detail.

The machine spindle 12 has a central, tapered recess 30 which receives an elongate and tapered body 32 of the chuck 10. The machine spindle 12 also has a flat face 34 which is perpendicular to the longitudinal axis of the recess 30 providing a mounting surface against which the chuck 10 can be accurately and concentrically aligned. The flat face 34 is also perpendicular to the axis of rotation of the chuck 12.

In the preferred embodiment the chuck 10 has a tapered outer wall 36, the central bore 16 and a radially extending flange 38 having generally opposed flat faces 22, 40 providing a flat face 40 mating with the machine spindle 12 and the flat face 22 mating with the tool holder 15. The expanding sleeve 14 is disposed adjacent to the tapered outer wall 36 and is received between the chuck 10 and the machine spindle 12 during use. To prevent the expanding sleeve 14 from sliding off of the chuck body 32, a retainer 42 is provided adjacent to the lower end of the expanding sleeve 14. An axially elongate and annular chamber 50 extends around the circumference of the outer wall 36 of the chuck body 32 between the outer wall 36 and expanding sleeve 14. Preferably, a pair of annular grooves 52, 54 are formed one on each side of the chamber 50 and each groove 52, 54 contains a sealing member 55 such as an O-ring to prevent leakage of the chamber 50 contents exteriorly of the grooves 52, 54. A passage 56 is disposed in the chuck body 32 communicating the chamber 50 with the central bore 16. Preferably, several passages 56 are circumferentially disposed about the body 32 each communicating with the chamber 50.

The central bore 16 has an upper threaded portion 60 constructed to threadably receive a threaded shank 62 of the machine tool holder 15. A collet 64 is received within the central bore 16 between the machine tool holder 15 adjacent the top 66 of the collet 64 and a threaded stop ring 68 threadably received interiorly of the central bore 16 adjacent the bottom 70 of the collet 64. An annular, axially elongate and preferably circumferentially continuous passage 72 is formed in the side wall 74 of the collet 64 in communication with each of the passages 56 through the chuck body 32. A through hole 76 in the side wall of the collet 64 communicates the annular passage 72 with the interior 78 of the collet 64. Preferably, several through holes 76 are provided circumferentially spaced about the side wall 74 of the collet 64. The collet 64 also has a cylindrical bore 80 providing an annular shoulder 82 adjacent the interior 78 of the collet 64. Preferably, a pair of annular grooves 84, 86 are formed one adjacent each end of the annular passage 72 adjacent the collet 64 and each groove 84, 86 has a sealing member 88 therein to contain any leakage of the contents of the annular passage 72.

An axially elongate adjustment rod 90 is disposed interiorly of the collet 64, extends through a central opening 92 of the threaded stop 68 and is threadably received in a complementary threaded portion 94 of a collar 96 adjacent one end 98 of the body 32 of the chuck 10. The adjustment rod 90 has an annular, radially extending head 100 providing a shoulder 102 and defining a pressure chamber 104 with the shoulder 82 of the collet 64. A pair of grooves 106, 108 with associated sealing members 110 are provided adjacent to the pressure chamber 104 preferably with one groove 108 formed in the head 100 of the adjustment rod 90 between the rod 90 and the collet 64 and the other groove 106 formed adjacent the bottom 70 of the collet 64 between the rod 90 and the collet 64. Preferably, a spring 112 is disposed within the pressure chamber 104 biasing the adjustment rod 90 to a position spaced apart from the shoulder 82 of the collet 64. Preferably, a socket 114 is provided in the head 100 of the adjustment rod 90 and is constructed to receive a tool therein to allow the adjustment rod 90 to be rotated to adjust the effective length of the collar 96 and adjustment rod 90. The collar 96 preferably has a head 120 constructed to be received in a tool or drawbar coupling for axial displacement of the collar 96 relative to the body 32 of the chuck 10.

In use, a machine tool holder 15 is threadably received in the chuck until the generally opposed flat faces 20, 22 between the tool holder 15 and the chuck 10 are firmly mated providing a concentric fit between the tool holder 15 and the chuck 10. Preferably the flat faces 20, 22 are perpendicular to the axis of the chuck 10 and parallel to the faces 34 and 40. The chuck 10 is then inserted into the tapered recess 30 of the machine spindle 12 until the opposed flat faces 34, 40 between the radially extending flange 38 of the chuck 10 and the spindle 12 are firmly mated thereby disposing their axes parallel to the axis of rotation of the spindle 12. A tool or coupling is then fitted over the head 120 of the collar 96 and the collar 96 is pulled to axially displace the collar 96 and the threadably connected adjustment rod 90. Displacing the adjustment rod 90 decreases the size of the pressure chamber 104 and thereby compresses and pressurizes the grease within the pressure chamber 104, the through holes 76, the annular passage 72, the passages 56 and the chamber 50 between the expanding sleeve 14 and the outer wall 36 of the chuck 10. The pressure between the expanding sleeve 14 and the outer wall 36 of the body 32 of the chuck 10 tends to expand the expanding sleeve 14 and urge it into firm engagement with the wall of the tapered recess 30 of the machine spindle 12 to concentrically locate and firmly hold the chuck 10 within the machine spindle 12. To adjust the size of the pressure chamber 104 and thereby ensure that the grease is not pressurized sufficiently to expand the expanding sleeve 14 before the chuck 10 is completely inserted into the spindle 12, the adjustment rod 90 can be axially adjusted by inserting a tool into the socket 114 of the rod 90 and rotating the rod 90 relative to the collar 96.

To release the chuck 10 from the spindle 12, the collar 96 is returned to its original position. This also returns the adjustment rod 90 to its original position and thereby increases the size of the pressure chamber 104 and decreases the pressure on the grease. The expanding sleeve 14 is no longer forced outward and it contracts to lessen the engaging force between the chuck 10 and the spindle 12. The sleeve 14 is expanded and contracted within the limits of its elastic deformation.

Figure 2:
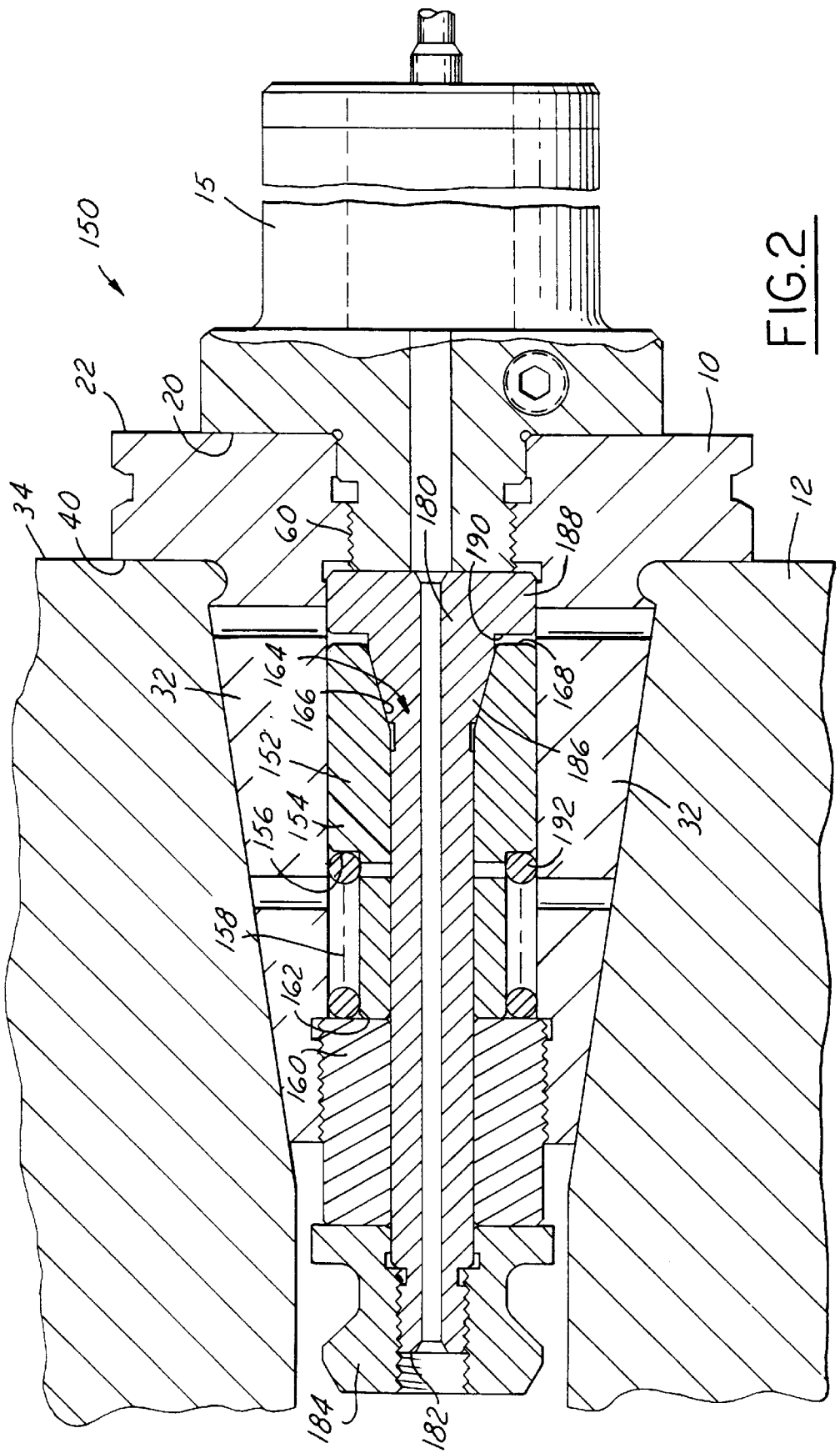
FIG. 2 is a sectional view of an alternate embodiment of a machine tool holder having a mechanically expandable sleeve.

In another embodiment 150, as shown in FIG. 2, a machine tool holder 15 is threadably received in the threaded portion 60 of the body 32 of the chuck 10 which has a radially extending flange 18 providing opposed flat faces 22, 40 one of which mates with a flat face 20 of the tool holder 15 and the other which mates with the flat face 34 of the machine spindle 12 as in the previous embodiment. In this embodiment 150, the expanding sleeve 152 is received interiorly of the central bore 16 of the body 32 of the chuck 10 and has an annular radially extending head 154 which provides a shoulder 156 defining a chamber 158 with a threaded stop ring 160 threadably received in the body 32 of the chuck 10 adjacent an end 162 of the expanding sleeve 152. The expanding sleeve 152 has a central through hole 164 and a tapered portion 166 formed adjacent the opposite end 168 of the expanding sleeve 152.

Figure 3:
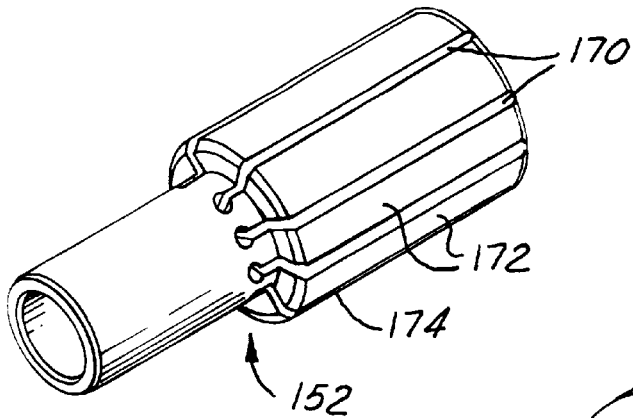
FIG. 3 is a side view of the collet of FIG. 2.
Figure 4:
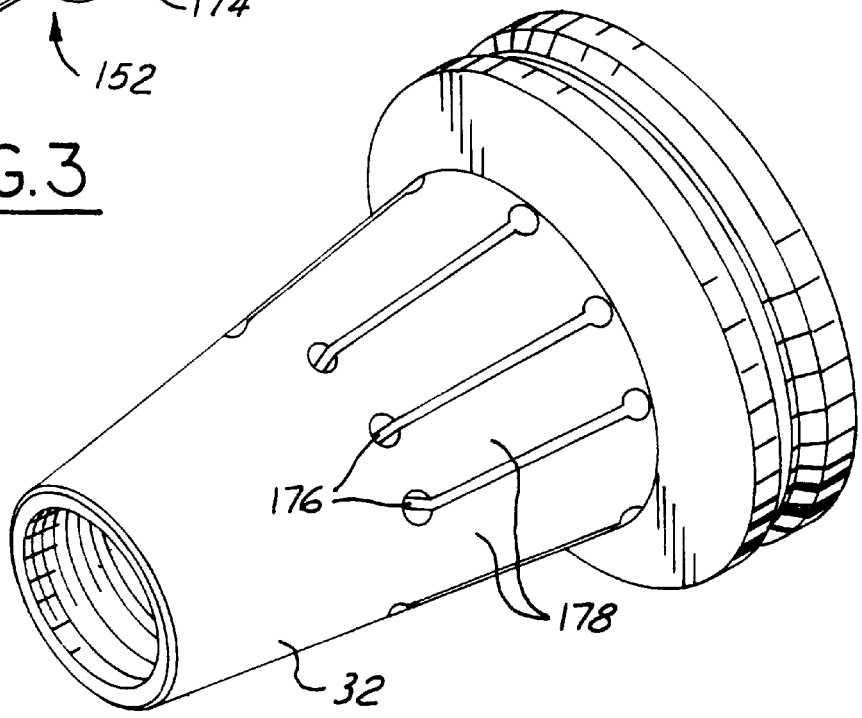
FIG. 4 is a side view of the body of the chuck of FIG. 2.

As shown in FIG. 3, the expandable sleeve 152 has longitudinally extending slits 170 spaced about the circumference of the expanding sleeve 152 and providing generally individual fingers 172 adjacent the end 168 of the expanding sleeve 152. This facilitates radial displacement of the side wall segments 174 of the expanding sleeve 152. As shown in FIG. 4, the body 32 of the chuck 10 has a plurality of circumferentially spaced and axially extending slots 176 extending radially through the body 32 of the chuck 10 and providing circumferentially spaced ribs 178 which facilitate displacement of that section of the body 32 of the chuck 10.

An adjustment rod 180 is disposed interiorly of the through hole 164 of the expanding sleeve 152 and is threadably received adjacent one end 182 by a collar 184 adjacent the threaded stop 160. The adjustment rod 180 has a tapered expander portion 186 with a shape that is complementary to the tapered portion 166 of the expanding sleeve 152 and is constructed to be received and mated therewith. Preferably, the adjustment rod 180 has an annular and radially extending head 188 providing a shoulder 190 which can be engagable with the end 168 of the expanding sleeve 152. Preferably, a spring 192 is disposed in the chamber 158 defined by the expanding sleeve 152 and the threaded stop 160 to bias the expanding sleeve 152 into engagement with the expander portion 186 of the adjustment rod 180.

In use, a machine tool holder 15 is threadably received in the threaded portion 60 of the chuck 10 until the opposed faces 20, 22 of the tool holder 15 and chuck 10 are mated. The chuck 10 is then slidably received within the tapered recess 30 of the machine spindle 12 until the face 40 of the radially extending flange 18 of the chuck 10 mates with the generally opposed flat face 34 of the machine spindle 12 thereby disposing their axes parallel to the axis of rotation of the spindle 12. The head of the collar 184 is then received in a tool or coupling and pulled to axially displace the collar 184 and the threadably connected adjustment rod 180. This displacement of the adjustment rod 180 relative to the expanding sleeve 152 forces the expander portion 186 into firm engagement with the tapered portion 166 of the expanding sleeve 152 and radially forces the fingers 172 of the expanding sleeve 152 outward into firm engagement with the body 32 of the chuck 10, thereby urging the body 32 of the chuck 10, and especially the section with the slots 176 removed therefrom, into firm engagement with the machine spindle 12 to concentrically locate and firmly hold the chuck 10 in the machine spindle 12.

Thus, in use, each of the embodiments provides an accurate, concentric, repeatable, releasable and reliable engagement of the chuck 10 in the machine spindle 12. In each of the embodiments, releasing the collar 96, 184 and returning the collar 96, 184 to its original position removes the force acting on the expanding sleeve 152 and allows the expanding sleeve 152 to contract to its original position. This releases the force of the engagement between the chuck 10 and the machine spindle 12 and allows the chuck 10 to be easily removed from the spindle 12. Each embodiment provides an accurate and reliable quick change device which provides the ability to accurately and reliably change tools with a minimum of down time of the machine.

I claim:

1. A tool holder mountable in a rotating machine spindle having an end face and a tapered cavity wall, the tool holder comprising:
   a body having a generally tapered sidewall and constructed to engage and retain a cutting tool holder coaxial with the tapered wall;
   a central bore in the body;
   an adjustment rod disposed interiorly of the central bore and axially moveable relative to the body;
   a collar attached adjacent one end of the rod;
   a radially extending flange adjacent an end of the body constructed to engage the end face of the machine spindle;
   an annular expansion sleeve carried by the body and in communication with the rod so that force applied to the collar first pulls the tool holder into the machine spindle until the flange firmly engages the end face of the spindle and further movement of the rod applies a force to generally radially expand the expansion sleeve to urge one of the body and sleeve of the tool holder into contact and firm engagement with the tapered cavity wall of the machine spindle, and in its unflexed state the one of the sleeve and body engageable with the tapered cavity wall has a slight clearance between them when the flange engages the end face of the spindle and before the sleeve is radially expanded.

2. The tool holder of claim 1 wherein the expansion sleeve is disposed adjacent the exterior of the body, tapered complementarily to the tapered cavity wall and expandable into direct engagement with the tapered cavity wall of the machine spindle.

3. The tool holder of claim 2 also comprising an annular pressure chamber defined at least in part by the adjustment rod and constructed to contain a fluid therein so that movement of the rod reduces the size of the pressure chamber and pressurizes the fluid within the pressure chamber which expands the expansion sleeve to urge the expansion sleeve of the tool holder into firm engagement with the tapered cavity wall of the machine spindle.

4. The tool holder of claim 3 wherein a passage through the body communicates the pressure chamber with the expansion sleeve.

5. The tool holder of claim 4 wherein a second annular pressure chamber is provided disposed between the expansion sleeve and the body and the passage through the side wall of the body communicates the pressure chamber with the second pressure chamber.

6. The tool holder of claim 3 wherein the initial position of the adjustment rod relative to the bore can be axially adjusted to ensure that when the collar is displaced the flange engages the end face of the spindle before fluid in the chamber is pressurized sufficiently to cause expansion of the expansion sleeve into firm engagement with the tapered cavity wall of the machine spindle.

7. The tool holder of claim 2 wherein a retainer is disposed adjacent the lower end of the expansion sleeve to retain the expansion sleeve adjacent the body.

8. The tool holder of claim 5 wherein the second pressure chamber is axially elongate to communicate with a substantial surface area of the expansion sleeve.

9. The tool holder of claim 5 wherein a seal is provided adjacent upper and lower ends of the second pressure chamber.

10. The tool holder of claim 9 wherein a pair of grooves are provided between the expansion sleeve and the body with one groove adjacent the upper end of the second pressure chamber and the other groove adjacent the lower end of the second pressure chamber each constructed to receive a sealing member therein.

11. The tool holder of claim 1 wherein the expansion sleeve is disposed interiorly of the central bore and has a central passage to accommodate the rod therein and the body has a tapered portion complementarily to and engageable with the tapered cavity wall of the machine spindle.

12. The tool holder of claim 11 wherein at least a portion of the expansion sleeve is tapered.

13. The tool holder of claim 12 wherein at least a portion of the rod has a complementarily tapered expander portion such that when the rod is displaced, the rod firmly engages the expansion sleeve to expand the expansion sleeve and urge it into firm engagement with the body and thereby urge the sidewall of the body into firm engagement with the tapered cavity wall of the machine spindle.

14. The tool holder of claim 13 wherein the rod is of such length that the flange firmly bears on the end face of the machine spindle before the rod expands the expansion sleeve.

15. The tool holder of claim 11 wherein the expansion sleeve is formed of a single piece of material with axially elongate slits extending from one edge of the expansion sleeve providing at least two fingers independent from each other adjacent that edge.

16. The tool holder of claim 13 wherein the body has a plurality of slots formed therethrough at least adjacent the expansion sleeve to facilitate generally radial displacement of the tapered portion of the body.

17. A tool holder mountable in a rotating machine spindle having an end face and a conical cavity with a tapered wall, the tool holder comprising:

a body having a radially extending flange constructed to engage the end face of the machine spindle and a tapered sidewall portion complementary to the tapered cavity wall of the machine spindle with a space between them when the flange engages the end face of the machine spindle, the body being constructed to engage and retain a cutting tool coaxial with the tapered wall of the body, a central bore in the body, an adjustment rod received in the central bore and axially movable relative to the body, a circumferentially continuous expansion sleeve carried by the body and having a tapered wall complementary to the tapered cavity wall of the spindle and in a relaxed state having a slight clearance between them when the flange engages the end face of the spindle and before the sleeve is generally radially expanded, a first annular chamber between the expansion sleeve and the body, a pressure chamber communicating with the annular chamber, defined at least in part by the adjustment rod and constructed to contain a fluid therein so that axial movement of the rod in one direction reduces the size of the pressure chamber and increases the pressure of the fluid in the pressure chamber and the annular chamber to expand generally radially the expansion sleeve into firm engagement with the tapered cavity wall of the machine spindle, and the rod is constructed and arranged so that axial movement of the rod in one direction first pulls the tool holder into the machine spindle until the flange firmly engages the end face of the machine spindle and further movement of the rod in the same direction applies a force to the fluid in the pressure chamber and the annular chamber to generally radially expand the sleeve into contact and firm engagement with the tapered cavity wall of the machine spindle after the flange engages the end face of the machine spindle.

* * * * *